United States Patent [19]
Soteropulos et al.

[11] 4,426,926
[45] Jan. 24, 1984

[54] BELT FOR ROUND BALER

[75] Inventors: Gust S. Soteropulos; Henry D. Anstey, both of Ottumwa, Iowa

[73] Assignee: Deere & Company, Moline, Ill.

[21] Appl. No.: 302,001

[22] Filed: Sep. 15, 1981

[51] Int. Cl.³ .................... A01D 39/00; B30B 5/06
[52] U.S. Cl. .................................. 100/88; 56/341; 198/688
[58] Field of Search ............... 100/88; 56/341–344, 56/364; 198/688, 847; 428/180

[56] References Cited

U.S. PATENT DOCUMENTS

2,909,271 10/1959 Taylor ............................ 198/688
4,172,354 10/1979 Vermeer et al. ................. 56/341

FOREIGN PATENT DOCUMENTS

218855 2/1968 Sweden ............................ 198/688

*Primary Examiner*—Peter Feldman

[57] ABSTRACT

A belt for large round baler has a roughly textured, crop-engaging surface formed by a plurality of continuous, uniform height walls defining a plurality of recesses therebetween. The walls may be arranged in a variety of polygonal shapes. The height of the walls is less than the maximum spacing between adjacent walls. The thickness of the walls decrease from the base toward the tip. The textured surface of the belt provides reduced levels of noise and dust, a self-cleaning action, lateral stiffness and longitudinal flexibility.

18 Claims, 5 Drawing Figures

4,426,926

BELT FOR ROUND BALER

CROSS REFERENCE TO RELATED APPLICATIONS

U.S. application Ser. No. 285,178 entitled STAGGERED ROLLS AND BELTS FOR ROUND BALER and filed on July 20, 1981, now U.S. Pat. No. 4,399,746, in the name of Jean Viaud is directed to a round bale having a bale-forming chamber defined by a plurality of belts trained about a plurality of rolls. The path of some of the belts around the rolls is varied to provide openings through which crop material in regions adjacent the bale forming chamber may escape.

U.S. application Ser. No. 308,223 entitled BELT TENSIONING SYSTEM FOR ROUND BALERS and filed Oct. 5, 1981 in the name of Koning et al, now U.S. Pat. No. 4,391,187, is directed to a round baler with a bale-forming chamber defined by a plurality of belts trained about a plurality of rolls. A pair of the rolls is journalled on a carrier arm and is movable on the arm during bale formation to control the size of the bale chamber and the density of the bale being formed in the chamber.

BACKGROUND OF THE INVENTION

This invention is directed to a baler (commonly known as "round baler") for forming cylindrical bales having a bale-forming chamber formed by a plurality of belts trained about a plurality of rolls and, more particularly, to the belts used to form the bale-forming chamber.

In a commercial machine, similar to that shown in U.S. Pat. No. 4,150,527, a smooth-surfaced rubber belt is used to form the bale-forming chamber. It was found that in certain crop conditions that the initiation of bale core formation is difficult. In addition crop material sometimes tends to wrap around one of the lower rolls (commonly known as the "starter roll") used to aid in the initiation of a bale core, to form a lower portion of the bale-forming chamber and to aid in retaining crop material within the chamber. The wrapping of the starter roll is detrimental to bale formation and can lead to the binding or breaking of the belts.

In accordance with another commercial machine, similar to that shown in U.S. Pat. No. 4,252,057, fabric reinforced, rubber belts with a roughly textured, crop-engaging surface are used. A belt of this type is shown in FIG. 5 of this application. A roughly textured belt is desirable for use with such balers because of its high coefficient of friction enchances the initiation of bale core formation for a variety of crops and crop conditions as well as enhancing the rolling action required to be imparted to the bale throughout the formation. However, certain disadvantages have been identified. First, crop material and trash tend to be caught and retained in the belt which is disadvantageous from an appearance point of view as well as because leaf loss is promoted when harvesting hay crops. In addition undesirable levels of dust and noise are generated in the baling operation. The dust results from the interaction of the textured surface of the belt with the surface of the bale being formed. The noise is due, in part, because to form a chamber of the type shown in U.S. Pat. No. 4,242,057, it is necessary for the belts to be looped around at least one belt supporting roller with the roughly textured, crop-engaging surface contacting the roller.

Accordingly, it is an object of this invention to provide a round baler belt with a surface texture providing improved stripping of crop material wrapped on a roll, such as a starter roll, disposed adjacent to the path of the belt.

Another object of this invention to provide a belt for a large round baler which has a high coefficient of friction to provide reliable bale core starting under a variety of crop conditions.

Another object of this invention is to provide a belt with a roughly textured, crop-engaging surface which is self-cleaning and to which crop material, especially leaves, does not adhere.

Another object of this invention is to provide a round baler belt with a roughly textured, crop-engaging surface which generates less dust and which generates less noise when the textured surface of the belt engages a roller around which it is trained.

Still another object of this invention is to provide a belt with a roughly textured surface such that the torque required to bend the belt about a longitudinal axis is greater than the torque required to bend the belt about a transverse axis.

SUMMARY OF THE INVENTION

These and other objects of the invention will be apparent from a consideration of the following detailed description in conjunction with the accompanying claims are accomplished by a fabric reinforced belt of elastomeric material. The crop-engaging surface is roughly textured. The texture is formed by a plurality of walls which define a plurality of entirely enclosed recesses. The height of the walls is less than the maximum distance between adjacent walls. The walls are continuous and have substantially equal height. The geometrical configuration of the walls may be selected from any number of polygonal designs. One preferred such design is one in which the walls form parallelograms and are oriented such that first and second lines extending respectively between the opposite pairs apexes of the parallelogram are parallel and perpendicular respectively to the length of the belt. The length of the first line is less than the second line. It is further preferable that the torque required to bend the belt about an axis perpendicular to the length is less than the torque required to bend the belt about an axis parallel to the length.

DESCRIPTION OF THE PREFERRED EMBODIMENT

Figure 1:
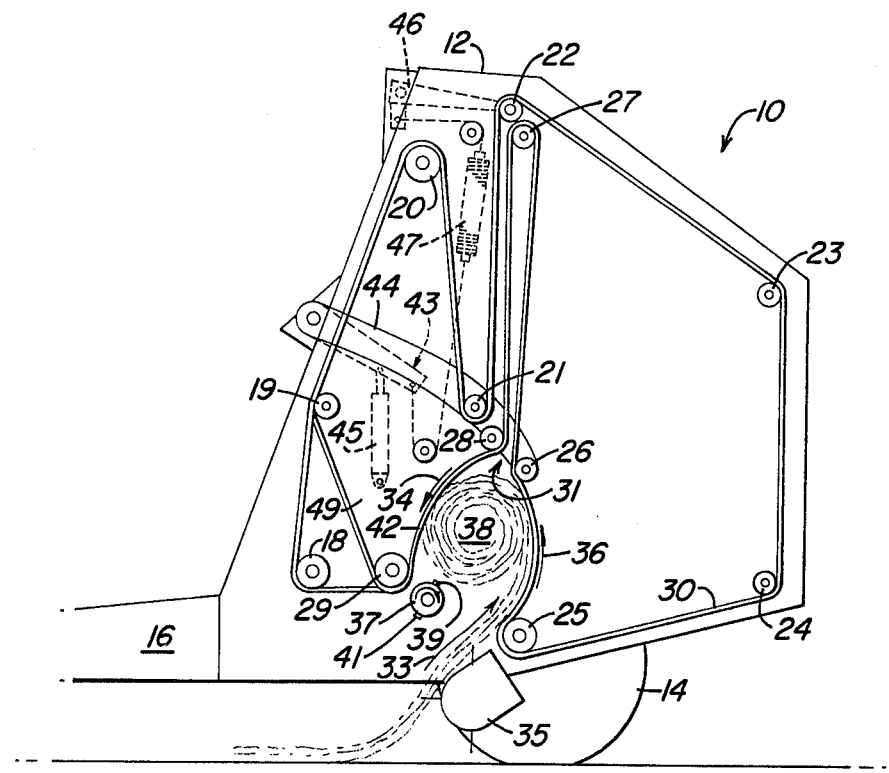
FIG. 1 is a cross-sectional side elevational view of a round baler of the general type with which a belt in accordance with the features of this invention is utilized. The cross-sectional view is taken along line 1—1 of FIG. 2.
Figure 2:
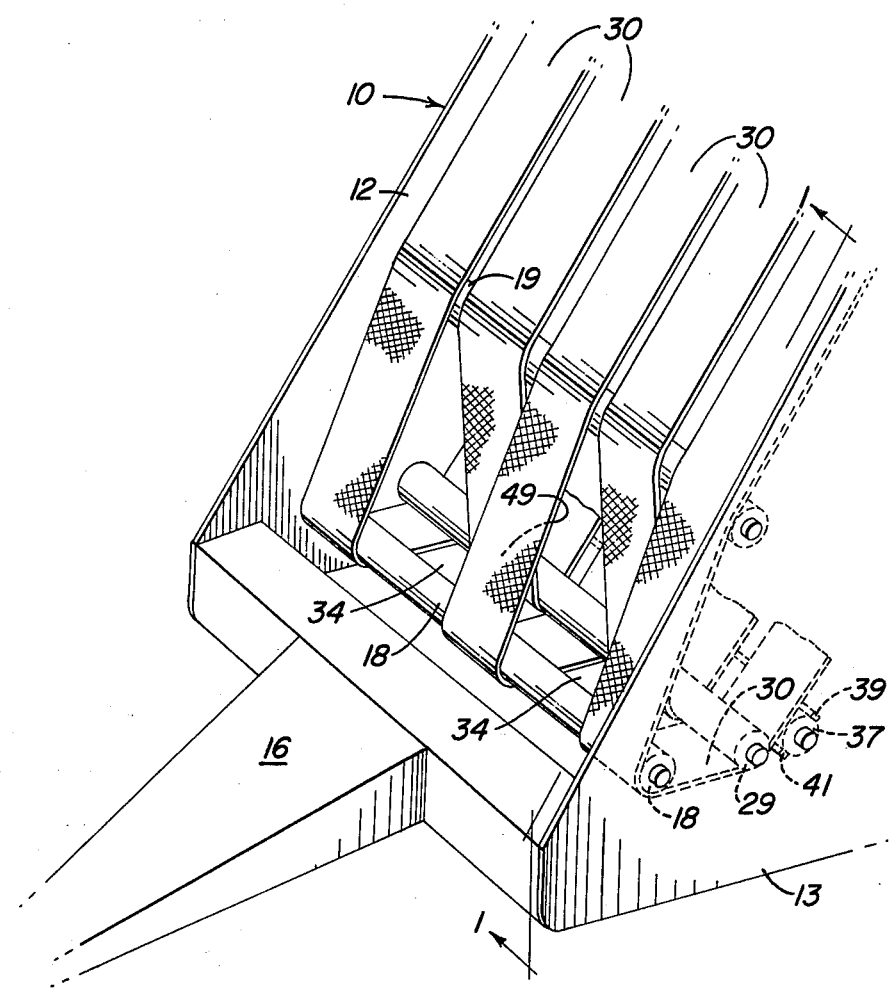
FIG. 2 is a front, fragmentary, perspective view of the baler of FIG. 1.

FIGS. 1, 2 show a baler 10 of the type with which a belt in accordance with features of this invention has particular utility. Baler 10 is comprised of various cross members (not shown) between a pair of fore and aft upright sidewalls 12, 13. Baler 10 is carried on wheels 14 (one shown) and is drawn behind a tractor (not shown) via a draft tongue 16. A plurality of rolls 18–29 extend between and are suitably journalled in side walls 12, 13. A plurality of side-by-side belts 30 are trained about rolls 18–29 to define an expandable bale-forming chamber 31 opening downwardly and forming a crop inlet 33. Roll 29 is driven by interconnection with the tractor PTO and in turn drives belts in the direction shown by arrows 34, 36. A starter roll 37 is provided generally between and parallel to rolls 25 and 29 and aids in the initiation of a bale core in chamber 31. A pair of ribs 39, 41 extending longitudinally of roll 37 aid the roll 37 in imparting a rolling action to a bale being formed and aid in stripping hay from belt span 42 to retain the crop material within bale-forming chamber 31. Roll 37 is positioned such that, when rotating, ribs 39, 41 are spaced slightly (e.g., 3 to 6 cm.) from the surface of belts 30 as they pass roll 29. Roll 37 is driven in a clockwise direction (FIG. 1) through conventional means (not shown).

The size of bale-forming chamber 31 is controlled by a belt tensioning system 43 which is described in detail in U.S. patent application, Ser. No. 308,223 cross-referenced above and the disclosure of which is hereby incorporated by reference. System 43 forms no part of the invention herein and will only be briefly described herein. Tensioning system 43 includes rolls 26 and 28 mounted at one end of carrier arm 44. Tensioning mechanism 43 further includes a belt take-up roller 21 for belt slack takeup and release during bale formation. The belt tensioning system 43 is also operable to control bale density through the use of a pair of hydraulic cylinders 45, springs 47, and arms 46, only one of each being shown herein.

Referring now to FIG. 2, the arrangement of alternating ones of belts 30 on roller 18 is shown and is described in detail in U.S. application, Ser. No. 285,178 cross-referenced above and the disclosure of which is hereby incorporated by referencence. This arrangement provides no part of the invention herein and therefore will not be described in detail herein. A plurality of openings 34 are formed by staggering the paths of belts 30 between rolls 19 and 29 through which crop may escape before causing roll wrapping and a buildup of entrapped crop within a volume 49.

Figure 3:
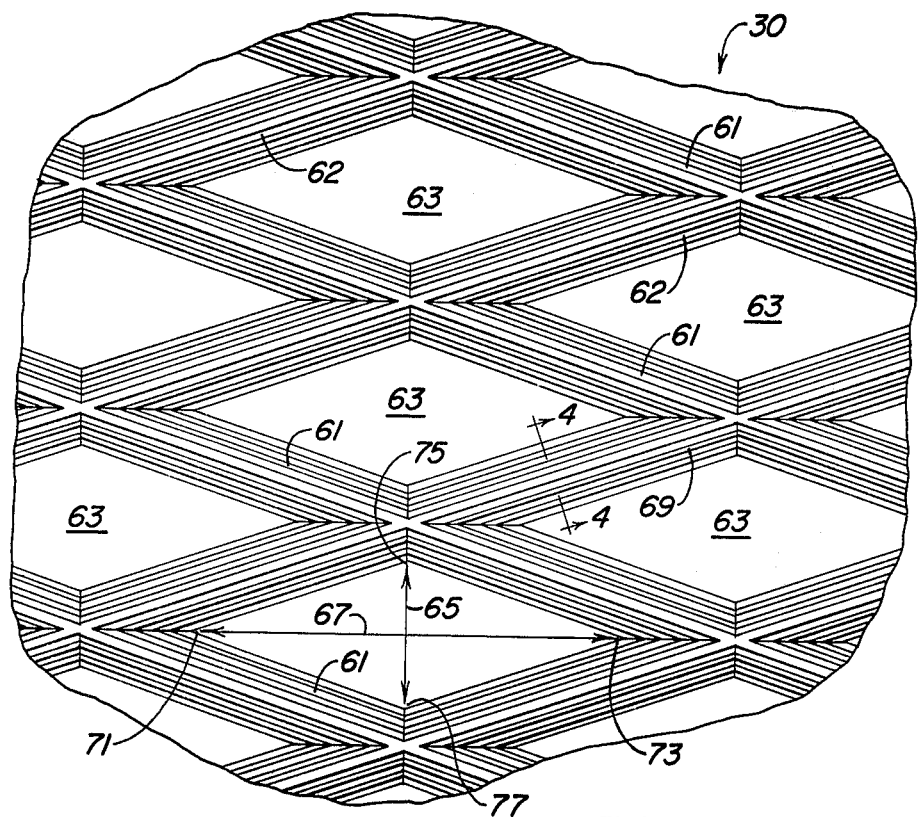
FIG. 3 is a fragmentary plan view of a belt segment in accordance with the features of this invention.
Figure 4:
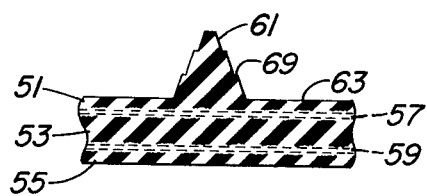
FIG. 4 is a cross-sectional view of the belt of FIG. 3 taken along line 4—4.

FIG. 3 shows an enlarged segment of one of the belts 30 in accordance with the features of the invention herein. The belt segment is oriented with the longitudinal axis of the belt extending lengthwise of the page. FIG. 4 shows a cross-section of the belt segment of FIG. 3. Belt 30 is comprised of a plurality of layers of elastomeric material here shown with three layers 51, 53, 55 interlayered with a pair of fabric reinforcement layers 57, 59. The elastomeric material is preferably rubber with a durometer of about 50–70 Shore A however other materials may be used (e.g., PVC). A plurality of continuous walls, including a first group of parallel continuously extending walls 61 and second group 62 of parallel continuously extending walls intersecting with said first group 61, define a plurality of entirely enclosed recesses 63. The height of the walls is substantially equal and is less than the maximum longitudinal spacing between adjacent walls of each of the two groups of walls 61, 62. The preferred height and longitudinal spacing are between 1 and 10 mm and between 2 and 12 mm, respectively. Compared to the prior art design of FIG. 5, the relationship between wall height and wall spacing provides recesses which are large and open and results in reducing noise and dust generation and in preventing crop entrapment in recesses 63. With little or no crop entrapment, leaf loss from a crop material such as alfalfa during bale formation is reduced.

In accordance with another feature of this invention, the thickness of the walls 61, 62 decrease in the direction from the base of the walls to the tip of the walls thereby preventing the entrapment of material within recesses 63. The thickness is preferably about 4 mm. at the base. The tapered walls aid in permitting belts 30 to be self-cleaning and aid in lessening the stripping of leaves from a crop material such as alfalfa. As the belts 30 are bent around each roll 18–29, the recesses enlarge outwardly in volume thereby increasing tendency to release crop material (i.e., to be "self-cleaning"). Walls 61, 62 are approximately triangular in cross section with a plurality of indentations 69 formed in the sloping sides of the walls. Indentations 69 provide an enhanced coefficient friction or increased "aggressiveness" of the belt on the bale during formation without the tendency to remove and capture portions of the crop material within the belt. Although not preferred for the reasons just discussed the walls 61, 62 may have parallel rather than tapered sides.

Walls 61, 62 are arranged to define a plurality of polygons here shown as parallelograms. Other types of polygons such as triangles, squares, rectangles may be used in lieu of a parallelogram configuration. In addition, circular and ellipsoidal configurations may be used. In accordance with the preferred orientation of walls 61, 62 as a parallelogram, the parallelograms are oriented and dimensioned such that a first line 65 between opposite apexes 71, 73 of the parallelogram and extending parallel to the length of the belt is shorter than a second line 67 extending between opposite apexes 75, 77 of the parallelogram and extending perpendicular to the length of the belt. With the shorter dimension of the parallelogram extending lengthwise of the belt, less torque is required to bend the belt about the axis of one of the rolls 18–29 perpendicular to the belt length than is required to bend the belt about an axis parallel to the belt length. This results from the fact that less stretching of walls 61 is required for bending belts 30 about a transverse axis than about a longitudinal axis. The relationship between the torques enhances belt integrity providing improved definition of the bale-forming chamber and belt tracking around rolls 18–29.

In accordance with still another feature of the invention, the coefficients of friction (or "aggressiveness") of the exterior surfaces of belts 30 and the exterior surface of roll 37 are balanced. The balanced or offsetting interaction of belts 30 against the exterior surface of roll 37 including ribs 39, 41 aid in preventing crop material from being expelled from bale-forming chamber 31 by movement between rolls 29 and 37, due to the outward movement of belt spans 42 of belts 30 and in preventing wrapping of crop material around roll 37. In order to achieve the balancing of aggressiveness, the height of ribs 39, 41 for a steel roll must be greater than the height of walls 61. In the preferred embodiment of the belt 30 shown in FIGS. 3, 4, the height and width of the ribs are about 8 mm. and 25 mm., respectively, while the wall height is about 4 mm.

It will be recognized by those skilled in the art that the balancing of the aggressiveness of roll 37 and belts 30 can be achieved through other designs. For example, roll 37 could be rubber-coated and thus requiring ribs 39, 41 to be reduced in height. Still another alternative would be to rubber coat roll 37 with a material similar to that used for belts 30. In this instance, the dimensioning of the walls for the belt and roll surface should be substantially equal.

In accordance with still another feature of the invention, the noise level caused in part by the running of the textured surface of belts 30 over upper roll 27 is minimized. Noise reduction compared to prior art designs is believed to be achieved because walls 61, 62 of belts 30 have a substantially uniform height throughout, thereby defining a continuous substantially planar surface of contact for engagement with roll 27.

Figure 5:
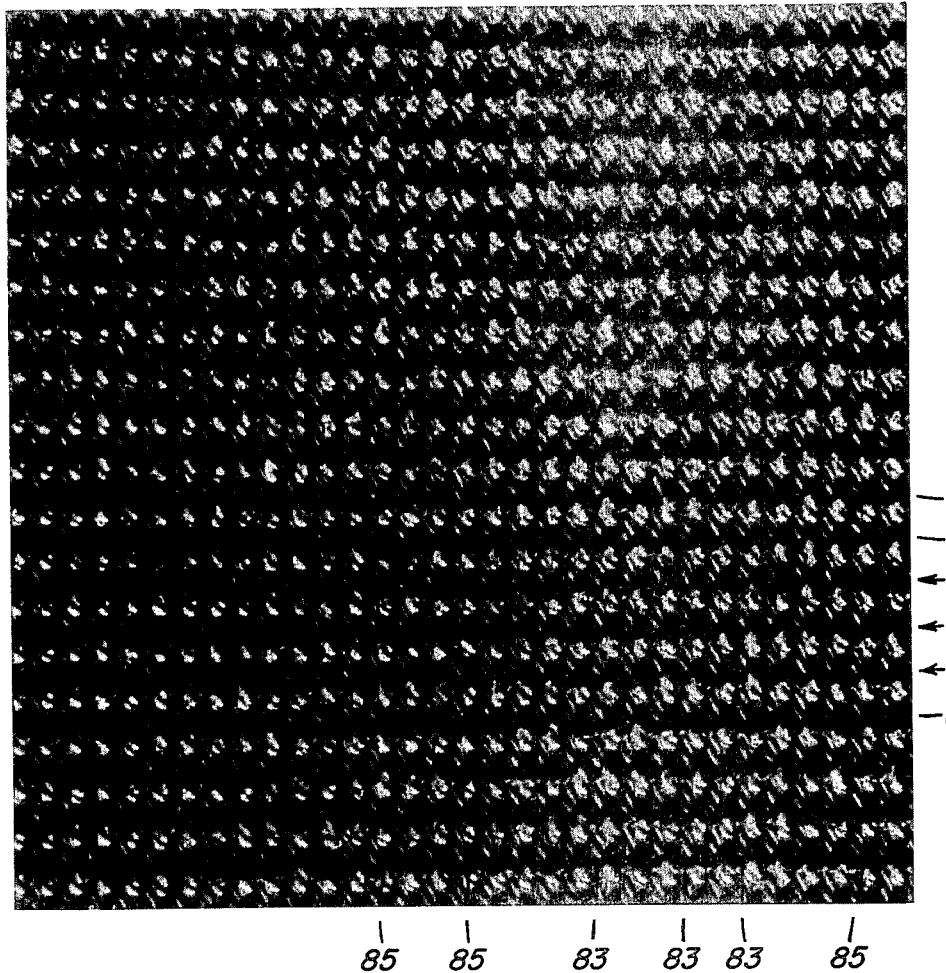
FIG. 5 is a photograph of a prior art round baler belt over which the invention herein is an improvement.

In the prior art design shown in FIG. 5, the belt texture has plurality of transverse ribs 79, the exposed tips 81 of which have an uneven height, and a plurality of longitudinal ribs 83 shorter in height than ribs 79. A plurality of recesses 85 are formed between ribs 79, 81. Ribs 79, 83 and the uneven surface thereof are believed to be the source of substantial noise and dust generation during operation of the prior art baler. Ribs 79 are relatively closely spaced and are substantially uniform width. Thus when such a belt is trained around a roll during bale formation, adjacent ribs are separated and tend to capture trash and crop material therebetween when ribs 81 return to their normal spacing.

The invention herein has been described in connection with certain preferred embodiments thereof. Other modifications and embodiments will be apparent to those skilled in the art. Accordingly it is intended that the appended claims cover all such variations and modifications as are within the true spirit and scope of this invention as set forth in the appended claims.

We claim:

1. In a round baler comprising a plurality of transverse rolls; a plurality of side-by-side, elastomeric, elongated belts supported in driving engagement thereon, said rolls and belts defining an expandable, bale forming chamber opening downwardly and forming a crop inlet between a spaced pair of said plurality of rolls; the improvement comprising:
a plurality of integral, continuous walls formed in one surface of said belts defining therebetween a plurality of entirely enclosed recesses, the height of said walls being less than the maximum longitudinal distance between adjacent walls.

2. The belt of claim 1 wherein said walls decrease in thickness in a direction from the base to the top of the wall.

3. The belt of claim 1 wherein the height of said walls is between 1 mm and 10 mm, and the maximum spacing between adjacent walls is between 2 mm and 12 mm.

4. In a round baler comprising a plurality of transverse rolls; a plurality of side-by-side, elastomeric, elongated belts supported in driving engagement thereon, said rolls and belts defining an expandable, bale forming chamber opening downwardly and forming a crop inlet between a spaced pair of said plurality of rolls; the improvement comprising:
a plurality of walls formed in one surface of said belts defining therebetween a plurality of entirely enclosed recesses, and said walls being continuous and having substantially equal height.

5. The belt of claim 4 wherein each of said walls extends continuously from side to side of said belt, a first group of said walls are mutually parallel and a second group of said walls are mutually parallel, said first group intersects said second group.

6. The belt of claim 4 wherein the longitudinal spacing between adjacent walls of said first group is less than the lateral spacing between adjacent walls of said first group.

7. The belt of claim 1 or 4 wherein said walls define a plurality of parallelograms.

8. The belt of claim 1 or 4 wherein said wall defines a plurality of polygons.

9. The belt of claim 1 or 4 wherein the height of said walls is between 1 and 10 mm.

10. The belt of claim 7 wherein said parallelograms are oriented such that first and second lines extending between opposite apexes are parallel and perpendicular, respectively, to the length of the belt, and the length of said first line is less than the length of second line.

11. The belt of claim 1 or 4 further comprising means for requiring the force to bend the belt about an axis perpendicular to the length to be less than the force to bend the belt about an axis parallel to the length.

12. The belt of claim 4 wherein the thickness of the walls decreases in the direction from the base to the tip of the wall.

13. In a round baler comprising a plurality of transverse rolls; a plurality of elastomeric, elongated, side-by-side belts supported in driving engagement thereon, said rolls and belts defining an expandable bale forming chamber opening downwardly and forming a crop inlet between a spaced pair of said plurality of rolls; a metal starter roll positioned parallel to and generally between said roll pair, said starter roll comprises a plurality of longitudinally extending ribs on an exterior surface of said roll, said starter roll spaced closely adjacent to one surface of said belts, said one belt surface defining the inner wall of said chamber; the improvement comprising:
a plurality of walls formed in said one surface of said belts defining therebetween a plurality of entirely enclosed recesses, the height of said walls being less than the maximum longitudinal distance between adjacent walls;
the height of said ribs being greater than the height of said walls and
said one belt surface and said starter roller interacting to aid in preventing crop material from being expelled from said chamber and from being wrapped around said starter roll.

14. The baler of claim 13 wherein said walls are continuous and have substantially equal height.

15. In a round baler comprising a plurality of transverse rolls; a plurality of elastomeric, elongated, side-by-side belts supported in driving engagement thereon, said rolls and belts defining an expandable bale forming chamber opening downwardly and forming a crop inlet between a spaced pair of said plurality of rolls; a starter roll positioned parallel to and generally between said roll pair, said starter roll comprises a plurality of longitudinally extending ribs on an exterior surface of said roll, said starter roll spaced closely adjacent to one surface of said belts, said one belt surface defining the inner wall of said chamber; the improvement comprising:
a plurality of walls formed in said one belt surface defining therebetween a plurality of entirely enclosed recesses, and said walls being continuous and having substantially equal height; and said one belt surface and said starter roller having balanced aggressiveness and interacting to aid in preventing crop material from being expelled from said chamber and from being wrapped around said starter roll.

16. The belt of claim 11 wherein said means is said plurality of walls arranged in a geometrical configuration having a transverse length on the belt greater than the longitudinal length on the belt.

17. The baler of claim 15 or 4 wherein:
an upper one of said rolls is located generally above said crop inlet; and
a span of said belts is looped over said upper roll and has said one belt surface in engagement with the outer surface of said upper roll, said span forming said downwardly opening chamber prior to the initiation of forming a bale in said chamber.

18. The bale of claim 13 or 1 wherein:
an upper one of said rolls is located generally above said crop inlet;
said walls are substantially equal in height; and
a span of said belts is looped over said upper roll and has said one belt surface in engagement with the outer surface of said upper roll, said span forming said downwardly opening chamber prior to the initiation of forming a bale in said chamber.

* * * * *